June 20, 1972 W. A. ALBERS, JR 3,671,309
PROCESS FOR MAKING TETRAGONAL GERMANIUM DIOXIDE
Filed April 15, 1970
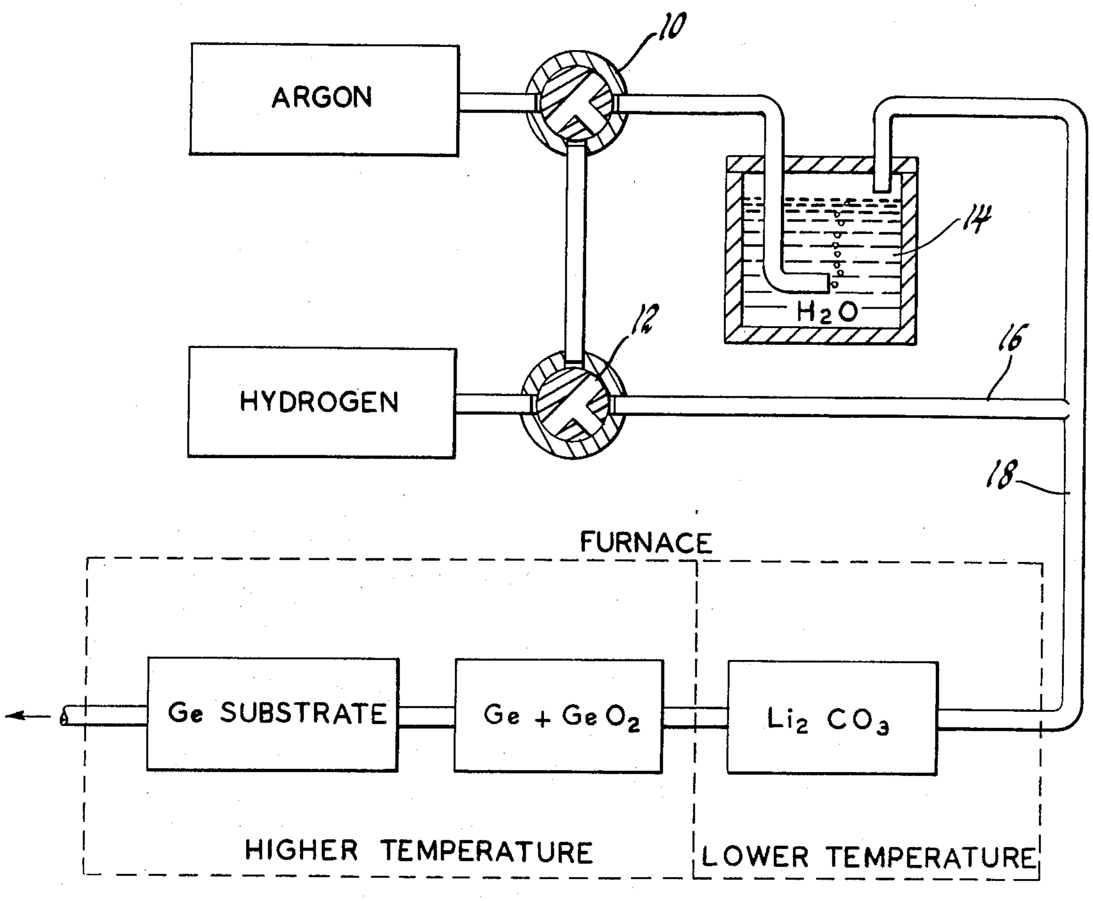
INVENTOR.
Walter A. Albers, Jr.
BY
R. J. Wallace
ATTORNEY United States Patent Office
3,671,309
Patented June 20, 1972

3,671,309
PROCESS FOR MAKING TETRAGONAL GERMANIUM DIOXIDE
Walter A. Albers, Jr., Northville, Mich., assignor to General Motors Corporation, Detroit, Mich.
Filed Apr. 15, 1970, Ser. No. 28,773
Int Cl. C23f 7/02
U.S. Cl. 117—201 8 Claims

ABSTRACT OF THE DISCLOSURE

A process and apparatus for directly oxidzing germanium into its insoluble oxide, the tetragonal form of germanium dioxide. A germanium surface portion is cleaned of all oxides and a new oxide is grown directly on that cleaned surface at normal pressure in a mildly oxidizing atmosphere containing a germanium monoxide vapor and an octahedral coordination catalyst. The apparatus provides particular means for growing a film of the tetragonal dioxide directly on the surface of a germanium wafer in a single furnace treatment.

BACKGROUND OF THE INVENTION

This invention relates to the semiconductor germanium, and more particularly to its germanium oxides. It more specifically involves directly producing the tetragonal form of germanium dioxide, instead of the soluble hexagonal or amorphous form which normally occurs.

The existence and the potential utility of the tetragonal form of germanium dioxide has long been recognized. The tetragonal form is thermodynamically the stable form of germanium dioxide at normal temperatures and pressures. The hexagonal form of germanium dioxide is thermodynamically metastable under these conditions. However, oxidation of germanium normally produces either an amorphous oxide or germanium dioxide of a hexagonal crystal structure, depending on the conditions under which the oxide has been formed. These other oxides are soluble in water, and the germanium exhibits a 4:2, tetrahedral, coordination in the hexagonal crystal structure. The germanium tetragonal germanium dioxide exhibits a 6:2 octahedral coordination characteristic of a rutile crystal structure. Since the tetragonal form is dense and substantially chemically inert, it is frequently referred to as the insoluble oxide form.

It is already recognized that films of tetragonal germanium dioxide could be as useful in germanium semiconductor devices as silicon dioxide films are in silicon semiconductor devices. However, no technique was known for conveniently producing films of the tetragonal dioxide form. It could only be produced by first forming the hexagonal dioxide and then converting it into the tetragonal dioxide at temperatures of about 750° C. to 1000° C. The most satisfactory conversion technique involves two separate operations and yield losses. Moreover, it subjects a semiconductive element to unduly high temperatures, which can deleteriously affect electronic properties of the elements being processed. Hence, this technique has not provided a commercially satisfactory means for producing tetragonal dioxide films on germanium.

Lower temperature conversion techniques are known but do not provide complete conversion. Moreover, the best known of these, a hydrothermal conversion, requires extremely high pressures, making it impractical for high volume commercial production.

SUMMARY OF THE INVENTION

It is an object of this invention to provide a process for directly producing a tetragonal germanium dioxide in a single operation on the surface of a germanium slice at a normal pressure and moderate temperatures.

It is also an object of this invention to provide an apparatus for conducting this process that is readily amenable to high volume commercial production. Another object is to provide a convenient method and apparatus for growing a film of tetragonal germanium dioxide directly on the surface of a germanium slice.

These and other objects of the invention are attained by initially cleansing a germanium surface portion of all oxides and, before permitting any amorphous or hexagonal oxide to form, slowly reoxidizing the cleansed surface portion in the presence of germanium monoxide vapor and an appropriate catalyst. In a preferred embodiment the catalyst is vaporized into a stream of moist argon containing small amounts of hydrogen, before the stream passes over the germanium surface. The germanium monoxide is also introduced into the argon mixture before it passes over the germanium slice.

BRIEF DESCRIPTION OF THE DRAWING

Other objects, features and advantages of the invention will become more apparent from the following description of preferred embodiments thereof and from the drawing which schematically shows an open ended tubular furnace and environment control for oxidizing germanium in accordance with the invention.

DESCRIPTION OF THE PREFERRED EMBODIMENTS

The invention is best described with reference to the drawing which shows sources of argon and hydrogen interconnected to a tube-type dual temperature zone furnace. By appropriate connection of two three-way valves 10 and 12 argon and hydrogen can be fed into the furnace alone or in varying proportions, with or without initially passing through a water bubbler 14. If one desires to flow a dry mixture of argon and hydrogen through the furnace, valves 10 and 12 can be adjusted to appropriately mix the gases, and pass them into conduit 16. From conduit 16 the gases pass into manifold conduit 18, and from there directly into the furnace. In the furnace the gaseous mixture first passes over a boat filled with lithium carbonate, which is positioned in the lower temperature zone of the furnace. This zone is high enough in temperature to vaporize the lithium carbonate, which introduces lithium oxide and carbon dioxide vapors into the furnace atmosphere.

The gases then flow along the furnace tube into the higher temperature zone of the furnace. In this latter zone they pass over a boat containing a mixture of germanium and germanium dioxide, which introduces germanium monoxide vapor into the gas stream. Then the gas stream passes over a germanium substrate and exits the adjacent outlet end of the furnace tube to the ambient. The two temperature zones of the furnace are separately controllable. In this way, the lower temperature portion of the furnace can be appropriately adjusted to introduce any desired amount of catalyst vapor into the furnace atmosphere.

In order to form a layer of tetragonal germanium dioxide on the surface of a germanium slice I prefer to first clean the slice in the normal and accepted manner for processing germanium, to insure that a satisfactory surface will be present upon which to grow the tetragonal oxide. The surface can be ground, and polished, and then washed with hydrofluoric acid, water and finally acetone. After drying it can be placed in the higher temperature zone of the furnace for treatment in accordance with the invention. For a mullite furnace tube approximately 18 inches long and having an inner diameter of about 2 inches, a charge of about 10 grams of lithium carbonate is used. It is placed in a quartz boat presenting a charge surface area of about one square inch. The quartz boat, as previously indicated, is positioned in the lower temperature zone portion of the furnace. This zone is maintained at approximately 350° C. at about one cubic foot per minute. The higher temperature portion of the furnace is maintained at approximately 500° C. A 10 gram mixture of germanium and germanium dioxide is placed in a quartz boat providing an exposed surface area for the mixture of about one square inch. The boat is positioned in the region of the higher temperature furnace zone adjacent the lower temperature zone. The charge contains 40%, by weight, germanium and the balance germanium dioxide.

A 5:1 mixture of hydrogen and argon is then introduced into the lower temperature end of the furnace. At this point in the process the argon is blended with the hydrogen and passes directly into the furnace without going through the water bubbler. The dry gas mixture is adjusted to flow through the furnace at a rate of about one-half cubic foot per minute.

The previously cleaned germanium slice is then placed in the higher temperature zone of the furnace, about 5 inches downstream from the germanium-germanium dioxide mixture. The dry hydrogen-argon gas flow is then continued at the same rate, and the temperature maintained at approximately 500° C., for approximately one hour. At this point all air-formed oxide on the germanium surface should be reduced, and the surface is now ready for growth of tetragonal germanium dioxide.

The argon gas is then diverted to pass through the water bubbler before mixing with the hydrogen and entering the furnace. The water in the bubbler is maintained at room temperature. Concurrently, the hydrogen gas flow is decreased to approximately 0.01 cubic feet per minute, and the argon flow increased to one cubic foot per minute. This can be accomplished by adjustment of the three-way valves 10 and 12. However, it is more practical to include a rate control valve (not shown) and flow rate meter (also not shown) as a part of each gas source. The gas adjustments are successively made in order to maintain a positive pressure differential between the furnace and its ambient atmosphere. This, of course, prevents any backflow of ambient gas into the furnace atmosphere during furnace atmosphere changeover.

The stated flow of the 100:1 mixture of argon to hydrogen is continued for approximately 30 hours, with the furnace temperatures being maintained at approximately 500° C. and 350° C., respectively, for the higher and lower temperature zones. Should one desire, the lower temperature zone of the furnace can be maintained fairly cool during the earlier, oxide reduction step and then increased to approximately 350° just before the oxidizing step. However, presence of the catalyst in the furnace atmosphere is apparently necessary even at the very outset of the oxidation process. The catalyst vapors, as well as the germanium monoxide vapors emanating from the germanium-germanium dioxide mixture, do not interfere with the reduction process. Hence, it is desirable to maintain the lower temperature zone of the furnace at the desired oxidation temperature even during the reducing step. This will normalize furnace conditions and insure high yields.

Under these conditions the germanium substrate will be oxidized at a rate of approximately 200 angstroms per hour. The resultant oxide film will be dense, continuous and tetragonal in crystal form. When a sufficient tetragonal germanium dioxide thickness has been produced, furnace heating can be discontinued, and the substrate allowed to cool with or without the continued flow of the argon gas, but the flow of hydrogen gas must be terminated.

It is particularly important in my process that the germanium surface portion being treated is cleaned of all amorphous and hexagonal oxides before starting growth of the tetragonal oxide form. Otherwise, a satisfactory coating of the tetragonal oxide cannot be obtained. While many techniques can be used, of course, one should select those which will not deleteriously affect any electronic properties which have been imparted to the germanium specimen involved. Surface oxides can be removed by mechanical or chemical techniques before they are placed in the furnace. Then, the reducing atmosphere of the furnace need only be used to reduce the thin oxide film that develops in air after the major surface cleanup has been done. I prefer to use hydrogen. However, any reducing atmosphere can be used so long as it leaves the germanium surface clean and ready to receive the new oxide layer.

The argon gas is primarily used to establish a nonreactive furnace environment to which reactive gases are added. It is used to dilute the hydrogen atmosphere and control the rate of reduction during the initial oxide reduction step of the process. While an inert gas such as argon is preferred other neutral gases such as helium and nitrogen can also be employed. During the oxidizing step, the argon also functions as a neutral carrier for the oxidant, the catalyst and the germanium monoxide vapors. I prefer to use water vapor as the oxidant. However, other oxidants, such as oxygen, can be employed but not in large proportions. Oxidation should not proceed at a rate substantially greater than approximately 300 angstroms per hour, as one encounters the risk of producing an amorphous film instead of a crystalline tetragonal dioxide film. In fact, even the rate of oxidation from argon bubbled through water at room temperature apparently must be slowed by adding hydrogen to the atmosphere. Control of the oxidation rate may also be achieved by diverting some of the argon gas directly into the furnace without passing through the bubbler, or by reducing the temperature of the water bubbler. However, I have found it convenient to merely add a small proportion of hydrogen to the moistened argon.

The minimum oxidation temperature for the higher temperature zone of the furnace is about 400° C. Below this temperature the rate of oxidation is impractically slow. Above about 600° C., the predetermined electronic properties of the germanium may be deleteriously affected.

The catalyst vapor which is employed should be the oxide of a monovalent metal from Group I of the Periodic Table of the Elements, particularly of an alkali metal, such as lithium, sodium, potassium and rubidium. These oxides apparently promote octahedral coordination of germanium in the oxide. While the oxides themselves can be used, it is more convenient to use a more readily vaporizable substance that will produce the oxide vapor. Carbonates of these metals serve this purpose quite well.

Care should be taken not to introduce excessive amounts of catalyst into the furnace atmosphere. Otherwise, compounds of the catalyst and germanium dioxide can form on the slice, instead of the tetragonal dioxide. On the other hand, if too little catalyst is used, the resultant film will not be completely tetragonal in crystal form, or even crystalline at all. I attempt to maintain a catalyst concentration of approximately 0.1–1 part catalyst per thousand parts furnace atmosphere. However, it is to be understood that this concentration may differ with varying oxidation rates, substrate surface areas and furnace cross-sectional volume. In any event, if an insufficient amount of catalyst is used a dense, continuous film of the tetragonal dioxide will not form. If an excessive amount of catalyst is used the surface will exhibit a mottled characteristic which is readily recognized.

Any source of germanium monoxide vapor would be satisfactory, so long as it can substantially saturate the furnace atmosphere. The germanium-germanium monoxide mixture can be varied in proportions to produce the appropriate vapor pressure that will saturate the furnace atmosphere at any treatment temperature being used.

Slow cooling of the slice after the oxide film has been formed is desirable. This avoids cracking and spalling of the film due to differences in thermal expansion characteristics between the film and the slice. The maximum rate of cooling will vary with the thickness of the film and substrate. To avoid any air quench problems, I prefer to furnace cool the slice.

It is to be understood that although this invention has been described in connection with certain specific examples thereof no limitation is intended thereby except as defined in the appended claims.

I claim:

1. The process of oxidizing germanium directly to its tetragonal dioxide comprising the steps of:

removing all oxides from a surface portion of germanium to form a deoxidized germanium surface portion;

successively re-oxidizing said deoxidized surface portion at substantially atmospheric pressure at a rate less than about 300 angstroms per hour in a mildly oxidizing atmosphere containing the vapor of a catalyst that will promote octahedral coordination for germanium atoms in germanium dioxide, said catalyst being an oxide of a monovalent metal from Group I of the Periodic Table of the Elements;

suppressing the vaporization of germanium monoxide formed as an intermediate product during said re-oxidation of said germanium surface portion; and continuing said re-oxidation while suppressing said germanium monoxide evaporation for a predetermined time to form a continuous film of said tetragonal oxide on said germanium surface portion.

2. The process as defined in claim 1 wherein the oxides are removed from the germanium surface portion by an initial chemical etch and subsequent air-formed oxide is then removed with a reducing gas at an elevated temperature below about 600° C.

3. The process as defined in claim 2 wherein the deoxidized surface is slowly re-oxidized by exposure at a temperature of about 400–600° C. to a mildly oxidizing furnace atmosphere of a moist neutral carrier gas that is substantially saturated with germanium monoxide vapor and also contains the vapor of at least one alkali metal oxide in a concentration of about 0.1–1 part per thousand.

4. The process as defined in claim 3 wherein the germanium surface portion is deoxidized with hydrogen and then oxidized in the same furnace chamber at essentially the same temperature with hydrogen gas being added to the furnace atmosphere to control the rate of oxidation.

5. The process of oxidizing germanium directly to its tetragonal dioxide comprising the steps of:

placing a substate having a germanium surface portion in a furnace through which reactive atmospheres are to be flowed at substantially atmospheric pressure;

providing sources of alkali metal oxide and germanium monoxide vapors in said furnace upstream from said substrate;

heating said substrate to a temperature of about 400–600° C.;

flowing a reducing atmosphere through said furnace at substantially atmospheric pressure past said sources and then over said substrate to deoxidize said germanium surface portion;

flowing a mildly oxidizing atmosphere through said furnace past said sources and then over said substrate to introduce alkali metal oxide vapors into the oxidizing atmosphere and to substantially saturate it with germanium monoxide vapor before it contacts said substrate;

changing over from said reducing atmosphere to said oxidizing atmosphere without any significant interruption in atmosphere flow; and removing said substrate from the furnace after a tetragonal dioxide film of desired thickness has been formed on it.

6. The process as defined in claim 5 wherein the reducing gas is a mixture of hydrogen and a neutral gas, and the mildly oxidizing gas is a mixture of a neutral gas, water vapor, and hydrogen.

7. The process as defined in claim 6 wherein the source of alkali metal oxide vapor is a vaporizable material disposed in a lower temperature zone of said furnace than said substrate, and the source of germanium monoxide vapor is a mixture of germanium and germanium dioxide in a temperature zone essentially the same as that of the substrate, with the mixture being of the appropriate relative proportions to substantially saturate the furnace atmosphere with germanium monoxide.

8. The process as defined in claim 7 wherein the neutral gas is argon, the alkali metal oxide is at least one oxide selected from the group consisting of lithium oxide and potassium oxide, and water vapor is introduced into the argon by bubbling it through water at room temperature before flowing it through the furnace.

References Cited

UNITED STATES PATENTS

| | | | |
|---|---|---|---|
| 3,260,626 | 7/1966 | Schink | 117—201 |
| 3,442,775 | 5/1969 | Wilkes et al. | 148—6.3 |
| 3,461,004 | 8/1969 | Lochner et al. | 117—106 A |
| 3,471,324 | 10/1969 | Wilson et al. | 117—106 A |
| 3,472,689 | 10/1969 | Scott | 117—106 A |
| 3,401,054 | 9/1968 | Wilkes | 117—201 |
| 3,436,285 | 4/1969 | Wilkes | 117—201 X |
| 3,401,056 | 9/1968 | Wilkes | 148—6.3 |
| 3,525,650 | 8/1970 | Panmer et al. | 148—6.3 |

WILLIAM L. JARVIS, Primary Examiner

U.S. Cl. X.R.

117—106 A